US011987181B2

(12) United States Patent
Kaufhold et al.

(10) Patent No.: US 11,987,181 B2
(45) Date of Patent: May 21, 2024

(54) DRIVER ASSISTANCE SYSTEM AND METHOD FOR COUPLING A TRAILER TO A TOWING VEHICLE

(71) Applicant: JOST-WERKE DEUTSCHLAND GMBH, Neu-Isenburg (DE)

(72) Inventors: Benjamin Kaufhold, Dreieich (DE); Swen Saupe, Mainz (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 287 days.

(21) Appl. No.: 17/314,444

(22) Filed: May 7, 2021

(65) Prior Publication Data

US 2021/0370830 A1    Dec. 2, 2021

(30) Foreign Application Priority Data

May 26, 2020   (DE) .......................... 102020003141.2

(51) Int. Cl.
*B60R 1/00*   (2022.01)
*B60D 1/01*   (2006.01)
(Continued)

(52) U.S. Cl.
CPC ................ *B60R 1/003* (2013.01); *B60D 1/01* (2013.01); *B60D 1/36* (2013.01); *B60G 17/0155* (2013.01);
(Continued)

(58) Field of Classification Search
CPC ................ B60R 1/00; B60R 2300/808; B60R 2300/8086; B60D 1/01; B60D 1/36;
(Continued)

(56) References Cited

U.S. PATENT DOCUMENTS

| 2005/0074143 A1* | 4/2005 | Kawai | ..................... B60D 1/62 |
| | | | 382/104 |
| 2005/0121879 A1* | 6/2005 | Smith | ..................... B60D 1/36 |
| | | | 280/477 |

(Continued)

FOREIGN PATENT DOCUMENTS

| DE | 102004043761 A1 | 3/2006 |
| DE | 102014003953 A1 | 9/2015 |

(Continued)

*Primary Examiner* — Truc M Do
(74) *Attorney, Agent, or Firm* — Hudak, Shunk & Farine Co. LPA

(57) ABSTRACT

A driver assistance system for coupling a trailer to a towing vehicle is described, including a video camera attached to the towing vehicle and an associated display device in the driver's field of vision, in whose video image a static guide marking is displayed along which a coupling mouth arranged on the towing vehicle can be contacted with a drawbar eye held on the trailer by a drawbar. Providing a driver assistance system which helps the driver estimating the three-dimensional position of the drawbar eye in relation to the towing vehicle while rearwards approaching a trailer. The video camera is arranged at a vertical distance from the coupling and the guide marking is formed by two beam corridors arranged on both sides of the vehicle's longitudinal axis converging towards one another in the rearward direction of the towing vehicle.

13 Claims, 4 Drawing Sheets

(51) Int. Cl.
  *B60D 1/36* (2006.01)
  *B60G 17/015* (2006.01)
  *B60R 1/26* (2022.01)
  *B60W 10/04* (2006.01)
  *B60W 10/10* (2012.01)
  *B60W 10/18* (2012.01)
  *B60W 10/22* (2006.01)
  *H04N 7/18* (2006.01)

(52) U.S. Cl.
  CPC ............... *B60R 1/26* (2022.01); *B60W 10/04* (2013.01); *B60W 10/10* (2013.01); *B60W 10/18* (2013.01); *B60W 10/22* (2013.01); *H04N 7/18* (2013.01); *B60G 2202/152* (2013.01); *B60G 2500/30* (2013.01); *B60R 2300/808* (2013.01); *B60R 2300/8086* (2013.01); *B60W 2420/403* (2013.01); *B60W 2540/10* (2013.01); *B60W 2710/06* (2013.01); *B60W 2710/10* (2013.01); *B60W 2710/18* (2013.01); *B60W 2710/22* (2013.01)

(58) Field of Classification Search
  CPC .......... B60G 17/0155; B60G 2202/152; B60G 2500/30; B60W 10/04; B60W 10/10; B60W 10/18; B60W 10/22; B60W 2420/42; B60W 2540/10; B60W 2710/06; B60W 2710/10; B60W 2710/18; B60W 2710/22; H04N 7/18
  See application file for complete search history.

(56) References Cited

U.S. PATENT DOCUMENTS

| | | | |
|---|---|---|---|
| 2011/0216199 A1* | 9/2011 | Trevino | H04N 7/183 348/148 |
| 2013/0321634 A1* | 12/2013 | Okano | G06T 11/60 348/148 |
| 2018/0061102 A1* | 3/2018 | Goto | B60D 1/36 |
| 2018/0253106 A1* | 9/2018 | Inui | B60D 1/06 |

FOREIGN PATENT DOCUMENTS

| | | |
|---|---|---|
| DE | 102014012330 A1 | 2/2016 |
| EP | 1377062 A1 | 1/2004 |

* cited by examiner

DRIVER ASSISTANCE SYSTEM AND METHOD FOR COUPLING A TRAILER TO A TOWING VEHICLE

FIELD OF INVENTION

The invention relates to a driver assistance system for coupling a trailer to a towing vehicle including a video camera attached to the towing vehicle and an associated display device in the driver's field of vision, in whose video image a static guide marking is displayed along which a coupling mouth arranged on the towing vehicle can be contacted with a drawbar eye held on the trailer by a drawbar. In addition, the invention is also implemented in a corresponding method.

BACKGROUND OF THE INVENTION

When coupled, the towing vehicle and the trailer form an articulated truck and trailer assembly. To couple the trailer, the towing vehicle with its coupling moves backwards to the stationary trailer until a drawbar eye formed on a drawbar of the trailer is correctly inserted into a coupling mouth of the coupling and is locked in it by means of a coupling bolt or locking bracket. However, it is particularly difficult to assess the spatial relative position of the coupling and drawbar eye in truck and trailer assemblies having central axle trailers, since the towing vehicles used for this purpose have the coupling set back very far inwards towards the rear axle of the towing vehicle.

In the prior art, efforts have already been made to simplify the coupling process of a towing vehicle and trailer by means of a driver assistance system for the driver. DE 10 2014 012 330 A1 describes such a system with a video camera which records the coupling and the rear environment with the drawbar eye in a video image. On a screen arranged in the driver's field of vision, a guide marking is displayed as a bearing aid, which comprises a horizontal height guide line and a vertical guide line. The disadvantage of this known driver assistance system is that the driver with the target cross formed from the height aid line and guideline only has a two-dimensional representation available for the approach of the towing vehicle without an estimate of the spatial depth.

EP 1 377 062 B1 discloses a rear view camera which is mounted on a passenger vehicle and which records an image displayed on a screen. The screen can be viewed from the driver's seat and the image contains an auxiliary line image which, based on the position of the trailer coupling, indicates the direct reverse direction. A relative position of the trailer coupling and the trailer-side coupling counterpart in the vehicle longitudinal axis can be recorded by additional horizontal lines that are oriented transversely to the vehicle longitudinal axis. An estimate of the altitude between the trailer coupling and the coupling counterpart is not provided and is also not relevant, since passenger cars regularly do not have a height-controllable air suspension.

SUMMARY OF THE INVENTION

The invention was therefore based on the object of providing a driver assistance system which helps the driver estimating the three-dimensional position of the drawbar eye in relation to the towing vehicle while rearwards approaching a trailer.

The underlying object of the invention is solved with the features of the independent claims. The coupling is typically a jaw coupling or a hook coupling for trucks.

According to one embodiment of a driver assistance system for coupling a trailer to a towing vehicle, including a video camera attached to the towing vehicle and an associated display device in the driver's field of vision, in whose video image a static guide marking is displayed along which a coupling mouth arranged on the towing vehicle can be contacted with a drawbar eye held on the trailer by a drawbar, the video camera is arranged at a vertical distance from the coupling, which results in a spatial depth in the video image. The vertical distance to the coupling can in principle be realized above the coupling or below the coupling, with the video camera being attached above the coupling in view of the installation situation on the towing vehicle being preferred. A video camera attached under the coupling is often in an exposed position and is therefore exposed to an increased risk of damage. The video camera is arranged on the coupling in the longitudinal axis of the vehicle in such a way that the coupling is arranged outside the video image of the video camera. Typically the camera is in a position towards the trailer behind the coupling. Accordingly, no components of the coupling are visible in the video image.

The beam corridors are arranged statically as an overlay to the video image of the video camera. For this purpose, the beam corridors can be fixedly arranged on a lens of the video camera. Alternatively, the beam corridors are generated in the video image with image processing software of the video camera or applied as an overlay to an image sensor of the video camera. In yet another embodiment, the beam corridors can be laid over the video image of the display device.

Based on a specified size of the coupling mouth and drawbar eye as well as a specified installation position and the resulting angle of inclination of the camera, the size of the drawbar eye in the video image increases as the towing vehicle approaches the trailer according to the course and size of the beam corridors. The beam corridors are in particular aligned symmetrically to the longitudinal axis of the vehicle. The drawbar eye can have a standardized and/or constant feature as a reference element, which is or is held within the beam corridors as the towing vehicle approaches the trailer. The reference element is preferably an outer diameter of the drawbar eye.

Due to the spatial course of the beam corridors, the position of the drawbar eye of the trailer can be estimated both in terms of its lateral position and in terms of its height relative to the beam corridors. If the video camera is positioned vertically above the coupling, the following applies: the lower the drawbar eye or its reference element, the further away the distance from the video camera and the smaller it appears relative to the beam corridors. The higher the drawbar eye or its reference element, the smaller the distance to the video camera and the larger it appears relative to the beam corridors. Due to the tapering alignment of the beam corridors, the drawbar eye or its reference element moves in the vehicle longitudinal axis relative to the beam corridors as the towing vehicle approaches, so that the driver can also estimate a distance in the vehicle longitudinal axis.

In addition to the spatial estimation of the position of the drawbar eye or its reference element, the vertically offset position of the video camera in relation to the coupling also results in a safety advantage, since it is not necessary to reach into the coupling's mouth for maintenance or cleaning of the video camera. In particular with jaw couplings, this always harbors the risk that a spring-loaded coupling bolt will loosen from its open position and snap forward into the closed position, which can cause serious hand injuries, for example. Due to the structural distance between the video camera and the coupling, it is subject to less contamination anyway, since no lubricating grease or abrasion of the coupling mouth or coupling bolt gets to the video camera and deposits it there.

According to a particularly preferred embodiment, the beam corridors each have an inner boundary line and an outer boundary line and a reference element of the drawbar eye is arranged in the video image between the inner boundary line and the outer boundary line of both beam corridors for correct coupling when the coupling mouth and the drawbar eye are approaching. Thanks to the beam corridors, the relative position of the drawbar eye can be estimated both in the lateral direction and in the longitudinal axis of the vehicle. The inner boundary line and the outer boundary line define the width of the associated beam corridor, from which height information of the coupling relative to the drawbar eye can be derived particularly well.

In the event that the drawbar eye, for example its outer diameter, protrudes laterally beyond the inner boundary line and the outer boundary line of both beam corridors, the coupling, which is fixedly mounted with respect to the video camera, is in a position that is too low. The static and always the same size beam corridors of the video camera are relatively too close to the drawbar eye, so that it is relatively large in the video image and protrudes beyond the inner and outer boundary lines.

If, on the other hand, the drawbar eye, for example its outer diameter, is aligned within the inner boundary lines of both beam corridors, the coupling, which is fixedly arranged to the video camera, is too high. The static and always equally large beam corridors of the video camera are spaced too far apart from the drawbar eye in the vertical direction, so that this is relatively small in the video image and, in particular its outer diameter, does not even protrude beyond the inner boundary lines.

This has the advantage that the outer diameter of the drawbar eye is particularly well visible in the video image, even in diffuse lighting conditions. It would also be possible to use an inner diameter of the drawbar eye as the reference element of the trailer, but the visible edges of the inner diameter of the drawbar eye are less easy to see. Additionally, lubricant deposits also falsify an estimate of the position of the inside diameter in relation to the beam corridors in the video image. In principle, it would also be conceivable to determine a reference element arranged in a stationary manner away from the drawbar and to scale the beam corridors to it. If this reference element, which is located away from the drawbar, is provided with an offset, correct retraction of the drawbar eye into the coupling would also be possible as long as the reference element is held between the inner boundary line and the outer boundary line of both beam corridors.

A distance between the inner boundary line and the outer boundary line of a beam corridor can in particular be dependent on a tolerance range of the coupling mouth and/or the drawbar eye. The tolerance range of the coupling indicates the misalignment of the coupling to the drawbar eye under which correct coupling is still possible. The greater the margin of tolerance of the coupling mouth, the greater the distance between the inner boundary line and the outer boundary line of a beam corridor can be.

The distance between the inner boundary line and the outer boundary line is preferably smaller as the distance in the vehicle longitudinal axis increases, that is to say each of the beam corridors tapers in the longitudinal axis of the vehicle as the distance increases.

The video camera is expediently arranged in the longitudinal axis of the vehicle. This results in the advantage that the video camera is aligned with the optimal coupling direction and the static beam corridors are arranged symmetrically to the coupling, so that there is no need for a lateral correction when displaying the video image.

It can also be useful if the coupling has a conically expanded wall section and the video camera is arranged above the conically expanded wall section. The expanded wall section surrounds an entry opening that is open in the axial direction to accommodate the drawbar eye and is used to tolerate misalignments of the coupling to the drawbar eye within certain limits by catching the drawbar eye by the expanded wall section and, when the towing vehicle approaches, leading the drawbar eye via the expanded wall section into its end position. With the expanded wall section, the coupling ends at its rear portion. A video camera arranged above the expanded wall section is consequently never covered by parts of the coupling, but always provides a clear field of vision in the direction of the trailer and the drawbar eye.

The coupling advantageously comprises a connecting flange for mounting on the towing vehicle and a coupling bolt mounted vertically in the coupling mouth, the video camera being arranged in the vehicle's longitudinal axis on the side of the coupling bolt facing away from the connecting flange. In this installation position, the camera is also arranged between the coupling bolt and the free side of the coupling mouth, so that the coupling bolt, which is also provided in the longitudinal axis of the vehicle, cannot get into the field of view of the video camera.

The coupling can, for example, have a collision protection plate arranged above the coupling mouth and the video camera can be fastened behind the collision protection plate. The collision protection plate primarily protects the coupling components attached above the coupling mouth, especially the locking mechanism, against damage caused by a misaligned drawbar eye. If the video camera is installed behind the collision protection plate, the camera is also protected against mechanical damage during coupling.

The collision protection plate is preferably designed with an opening and the video camera is arranged in alignment with the opening. This results in the advantage that on the one hand the camera has a clear field of view to the rear in the direction of the trailer and on the other hand is protected by the collision protection plate. The opening should be dimensioned and the video camera spaced so far from the opening that the outer diameter of the drawbar eye only partially extends into the opening and no contact with the video camera is possible.

According to a further, special embodiment, the driver assistance system can influence the engine control and/or transmission control and/or brake control and/or height control of the air suspension automatically or upon driver release.

According to this embodiment, the diver assistance system is an autonomous assistance system that approaches and hitching the trailer without the driver having to do anything.

According to the inventive method for coupling a trailer to a towing vehicle, the guide marking is visualized by means of two beam corridors arranged symmetrically to the longitudinal axis of the vehicle and and converge towards one another in the rearward direction of the towing vehicle.

In a particularly expedient process step, it can be provided that the beam corridors each have an inner boundary line and an outer boundary line and during an approach of the coupling mouth and the drawbar eye a correct coupling appears when a reference element of the drawbar eye is arranged in the video image between the inner boundary line and the outer boundary line of both beam corridors.

Expediently, a drawbar eye projecting beyond both outer boundary lines in the video image visualizes the lifting of the towing vehicle preferably by means of its air suspension.

On the other hand, a drawbar eye arranged in the video image within the two inner boundary lines can be used to visualize that the towing vehicle is being lowered preferably by means of its air suspension.

BRIEF DESCRIPTION OF THE DRAWINGS

For a better understanding, the invention is explained in more detail below with reference to seven figures showing in FIG. 1: a side view of a jaw coupling with a video camera in the correct orientation in front of a drawbar eye immediately before coupling.

DETAILED DESCRIPTION OF THE INVENTION

Figure 1:
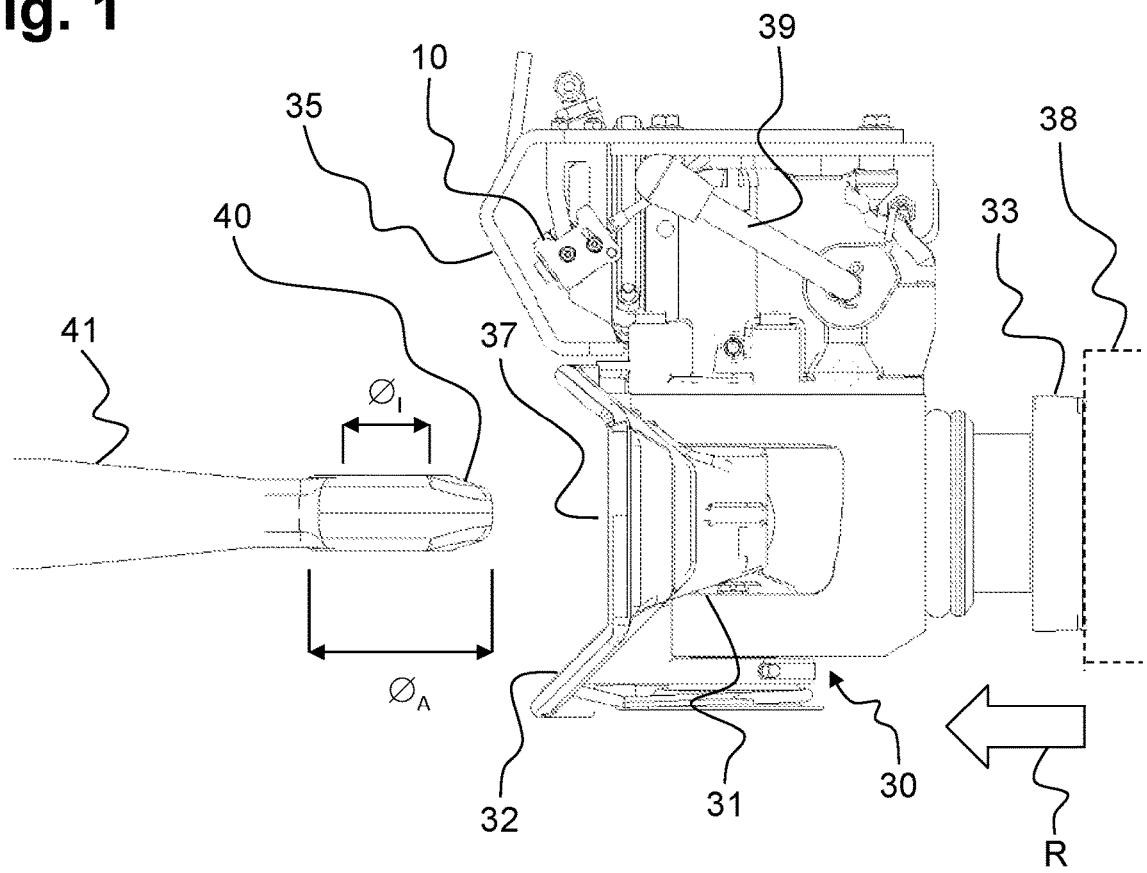
Figure 2:
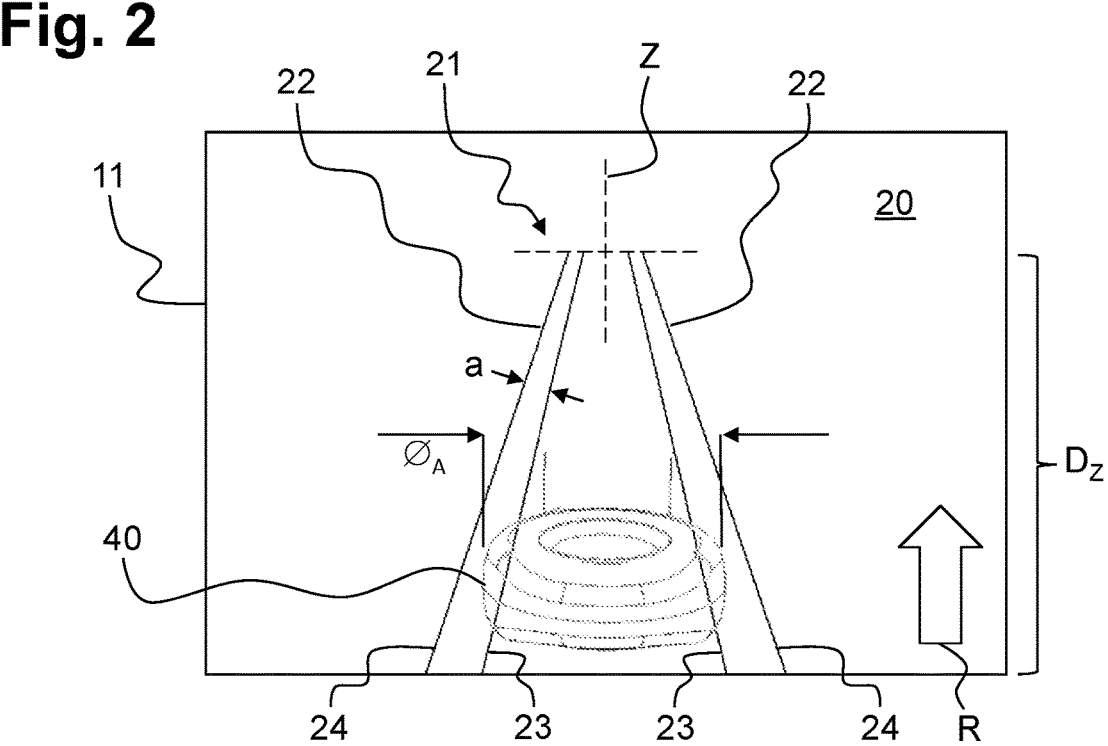
FIG. 2: a video image with beam corridors and drawbar eye corresponding to the situation in FIG. 1.

FIG. 1 shows a side view of a jaw coupling 30 and a video camera 10 attached to it. The video camera 10 and a display device 11 shown in FIG. 2 are part of the driver assistance system. The display device 11 is expediently arranged in a driver's cab of a towing vehicle (not shown) and is therefore in the driver's field of vision.

The jaw coupling 30 comprises a coupling mouth 31 that is open to the rear and a connecting flange 33 for the fixed installation of the jaw coupling 30 on the towing vehicle, in particular on a vehicle frame 38 of the towing vehicle. The coupling mouth 31 is formed with an expanded wall section 32 which completely surrounds an entry opening 37 in the circumferential direction and is open on one side in the axial direction. The video camera 10 is attached in a vehicle longitudinal axis Z (see FIG. 2) above the coupling mouth 31.

In the illustration of FIG. 1, a drawbar eye 40 attached to the end of a drawbar 41 is in the correct orientation directly in front of the entry opening 37. With the help of the drawbar 41 and the drawbar eye 40, a trailer (not shown) is releasably attached to the towing vehicle. When the towing vehicle travels backwards in direction R, the drawbar eye 40 enters the jaw coupling 30 via the entry opening 37 and, after reaching its end position, is held there pivotably in the jaw coupling 30 by means of a coupling bolt 34.

Before the trailer is coupled, the coupling bolt 34 is in an open position, which can be achieved by using an operating lever 39. When the jaw coupling 30 comes into contact with the drawbar eye 40, the spring-preloaded coupling bolt 34 snaps down into its closed position and completely penetrates an inner diameter $\emptyset_I$ of the drawbar eye 40. In its closed position, the coupling bolt 34 runs vertically through the coupling mouth 31 of the jaw coupling 30, which can be seen particularly well in the illustration in FIG. 7, and is supported on opposite sides of the coupling mouth 31.

The expanded wall section 32 of the coupling mouth 31 makes it easier to pick up a jaw coupling 30 that is not correctly aligned with the drawbar eye 40 and thus expands the tolerance space of the coupling mouth 31. The tolerance space defines an area within which, when the towing vehicle is reversing in direction R, a drawbar eye 40 aligned vertically or laterally offset to the jaw coupling 30 slides into the entry opening 37 by making contact with the expanded wall section 32.

The scenario illustrated in FIG. 1 is presented to the driver on the display device 11 in a video image 20 transmitted by the video camera 10 according to FIG. 2. In the video image 20, the rear area behind the towing vehicle and the drawbar eye 40 of the trailer to be coupled are shown. The jaw coupling 30 is not shown in the video image 20 because it is located outside an area captured by the video camera 10.

For an estimation of the relative position of the drawbar eye 40 to the towing vehicle, a guide marking 21 in the form of two beam corridors 22 tapering in the rearward direction is shown on the display device 11. The two beam corridors 22 are aligned symmetrically to one another with respect to the vehicle longitudinal axis Z, with one of the beam corridors 22 being arranged on one side of the vehicle longitudinal axis Z in each case. Each beam corridor 22 has an inner boundary line 23 facing the other beam corridor 22 and an outer boundary line 24 facing away from the other beam corridor 22. The inner boundary line 23 is spaced apart from the outer boundary line 24 at a distance a perpendicular to it. The distance a decreases with increasing distance $D_Z$ from the video camera 10 in the longitudinal axis Z of the vehicle.

The alignment of the beam corridors 22 and the distance a, as a reference element of the trailer, are matched to the known, usually standardized size, the drawbar eye 40, in the present case to its outer diameter $\emptyset_A$, since this can be seen better in the video image 20 than the inner diameter $\emptyset_I$. In principle, however, the inside diameter $\emptyset_I$ or another reference element arranged in a stationary manner on the trailer could also be used and, if necessary, an offset to the position of the drawbar eye 40 could be applied.

The beam corridors 22 visualize the driver during the reverse drive R a correct alignment of the jaw coupling 30 to the drawbar eye 40, as long as the reference element, for example, the outer diameter $\emptyset_A$ of the drawbar eye 40 covers both beam corridors 22 such that in each beam corridor 22 a section of the outer diameter $\emptyset_A$ between the inner boundary line 23 and the outer boundary line 24 is arranged. In reverse direction R, the driver maneuvers the towing vehicle in such a way that a section of the outer diameter $\emptyset_A$ is held between the inner boundary line 23 and the outer boundary line 24 in both beam corridors 22. As the towing vehicle approaches the stationary trailer in the longitudinal axis Z of the vehicle, the image of the drawbar eye 40 and thus also its outer diameter $\emptyset_A$ in the video image 20 increases in the same way as the size of the beam corridors 22. If the drawbar eye 40 leaves the lower edge of the video image 20, the driver can estimate that contact between the coupling mouth 31 and the drawbar eye 40 occurs immediately.

FIG. 3 to FIG. 6 illustrate situations in which the towing vehicle is in the center of the vehicle's longitudinal axis Z in front of the drawbar eye 40, but the height adjustment of the air suspension is incorrectly set and, when the towing vehicle approaches, the drawbar eye 40 moves over the coupling mouth 31 or passes under the coupling mouth 31 and would therefore cause severe damage to the towing vehicle.

Figure 3:
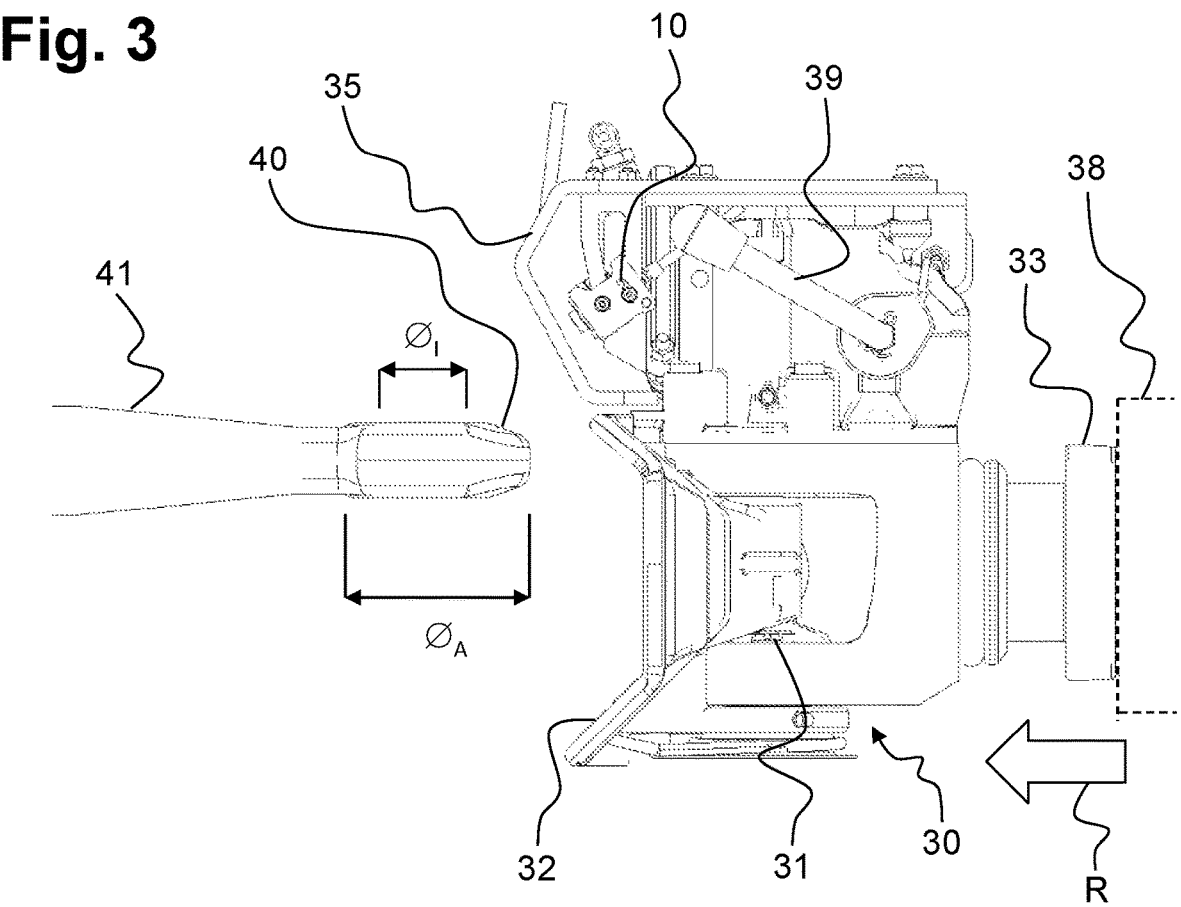
FIG. 3: a side view of a too low aligned jaw coupling with video camera in front of a drawbar eye immediately before coupling.

In a side view, FIG. 3 shows a too low, vertical position of the jaw coupling 30. For a correct retraction of the drawbar eye 40 into the coupling mouth 31, the towing vehicle would have to be raised by means of the air suspension.

Figure 4:
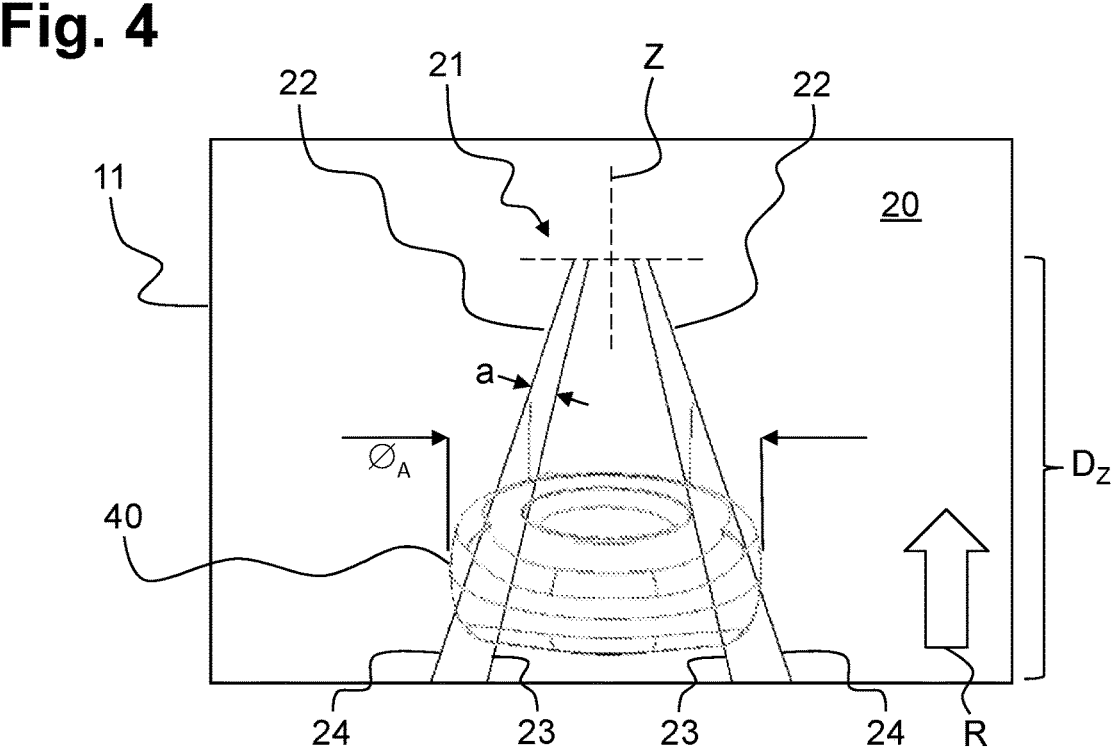
FIG. 4: a video image with beam corridors and drawbar eye corresponding to the situation in FIG. 3.

The drawbar eye 40 is located relatively close to the video camera 10, so that the drawbar eye 40 is shown larger in the video image 20 according to FIG. 4 than the static, always equally sized beam corridors 22. The outer diameter $Ø_A$ protrudes beyond both, the inner boundary line 23 and the outer boundary line 24, of both beam corridors 22. To continue the coupling, the towing vehicle would have to be raised by means of its air suspension until a larger vertical distance is established between the video camera 10 so that in the video image 20 the outer diameter $Ø_A$ of the drawbar eye 40 has moved between the inner boundary line 23 and the outer boundary line 24 of both beam corridors 22.

Figure 5:
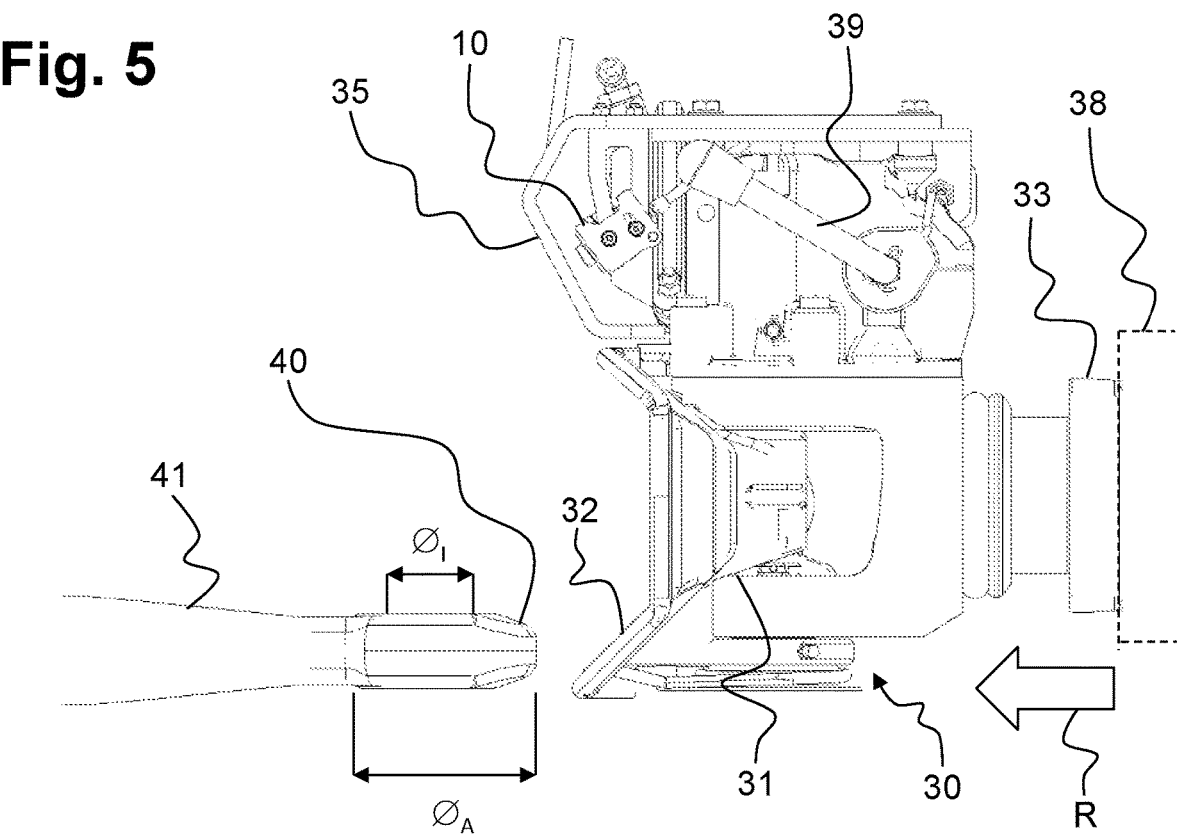
FIG. 5: a side view of a too high aligned jaw coupling with video camera in front of a drawbar eye immediately before coupling.

In a side view, FIG. 5 shows a too high, vertical position of the jaw coupling 30. For a correct entering of the drawbar eye 40 into the coupling mouth 31, the towing vehicle would have to be lowered by means of the air suspension.

Figure 6:
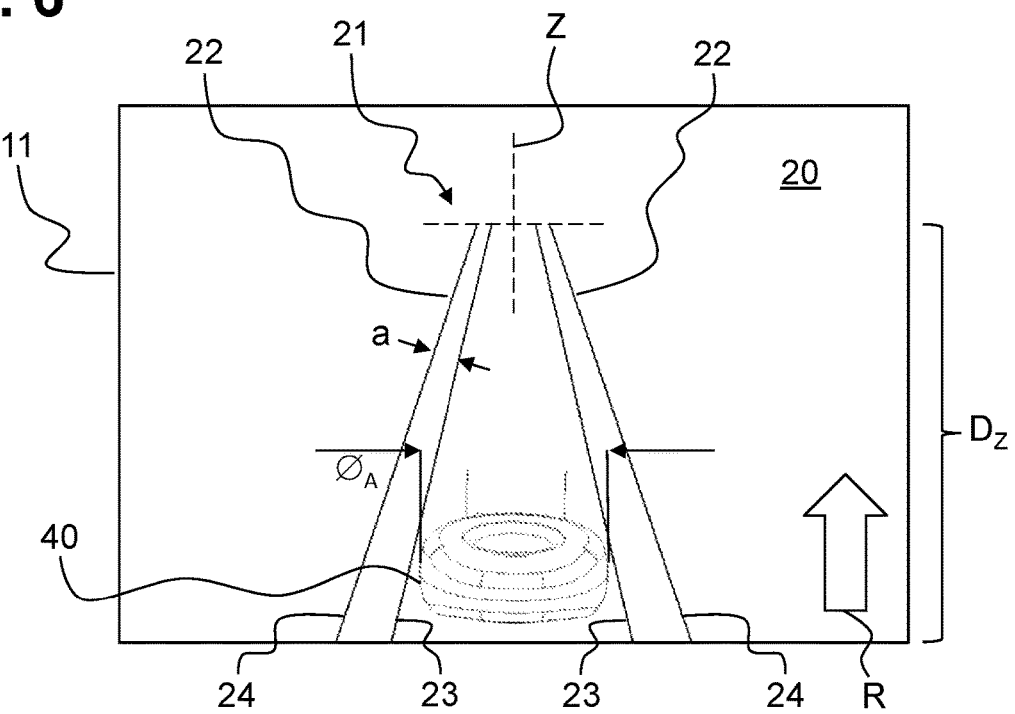
FIG. 6: a video image with beam corridors and drawbar eye corresponding to the situation in FIG. 5 and FIG. 7: a front view of a jaw coupling with a collision protection plate and video camera.

The drawbar eye 40 is located in a relatively distant position from the video camera 10, so that in the video image 20 of FIG. 6 the drawbar eye 40 is shown smaller than the static, always equally sized beam corridors 22. The outer diameter $Ø_A$ is arranged between the beam corridors 22 and just extends as far as the inner boundary lines 23. To continue the coupling, the towing vehicle would have to be lowered by means of its air suspension until a smaller vertical distance is established between the video camera 10 and the drawbar eye 40 so that the outer diameter $Ø_A$ in the video image 20 has moved between the inner boundary line 23 and the outer boundary line 24 of both beam corridors 22.

Figure 7:
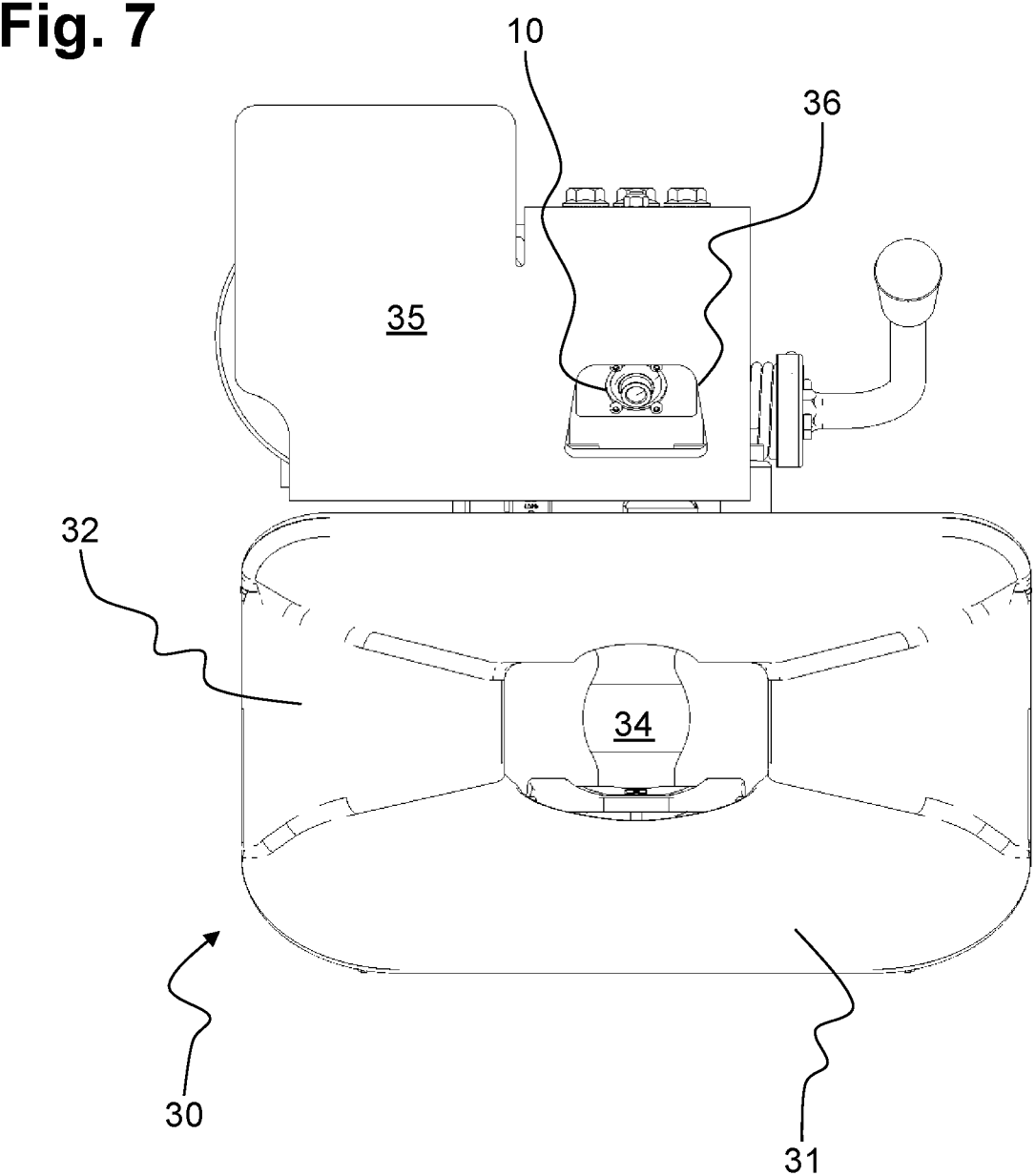

FIG. 7 shows a jaw coupling 30 in a front view. A collision protection plate 35 is attached vertically above the coupling mouth 31. The collision protection plate 35 covers parts of the locking mechanism and in particular the operating lever 39 in the vehicle longitudinal axis Z from the rear, in order to avoid damage caused by the drawbar eye 40 during coupling of the trailer if the jaw coupling 30 is set too low.

In the vehicle longitudinal axis Z, the collision protection plate 35 projects beyond the expanded wall section 32 towards the rear, so that the video camera 10 is positioned essentially above the free end of the expanded wall section 32.

In the longitudinal axis Z of the vehicle, an opening 36 is formed in the collision protection plate 35, behind which the video camera 10 is aligned. The opening 36 is dimensioned in such a way and the video camera 10 is spaced from the opening 36 in such a way that the known outer diameter $Ø_A$ of the drawbar eye 40 cannot penetrate so far into the opening 36 that the video camera 10 is contacted and damaged, even if the drawbar eye 40 hits with a great force against the collision protection plate 35.

LIST OF REFERENCE NUMBERS 10 video camera
11 display device
20 video image
21 guide marking
22 beam corridors
23 inner boundary line of beam corridor
24 outer boundary line of beam corridor
30 coupling/jaw coupling
31 coupling mouth
32 expanded wall section
33 connecting flange
34 coupling bolt
35 collision protection plate
36 opening protection plate
37 entry opening
38 vehicle frame towing vehicle
39 operating lever
40 drawbar eye
41 drawbar
a distance inner/outer boundary line
$D_Z$ distance in the vehicle's longitudinal axis
R reversing towing vehicle
Z vehicle longitudinal axis
$Ø_A$ outer diameter of drawbar eye
$Ø_I$ inner diameter of drawbar eye

What is claimed is:

1. A driver assistance system for coupling a trailer to a towing vehicle, comprising:
a video camera attached to the towing vehicle and an associated display device in a driver's field of vision, in whose video image a static guide marking is displayed along which a coupling mouth arranged on the towing vehicle can be contacted with a drawbar eye held on the trailer by a drawbar,
wherein the video camera is arranged at a vertical distance from a coupling and the guide marking is formed by two beam corridors arranged on both sides of the vehicle's longitudinal axis (Z) converging towards one another in the rearward direction of the towing vehicle, and
wherein the beam corridors each have an inner boundary line and an outer boundary line and for a correct coupling a reference element of the drawbar eye is arranged in the video image between the inner boundary line and the outer boundary line of both beam corridors during the approach of the coupling mouth and the drawbar eye.

2. The driver assistance system according to claim 1, wherein the reference element is an outer diameter ($Ø_A$) of the drawbar eye.

3. The driver assistance system according to claim 1, wherein a distance (a) between the inner boundary line and the outer boundary line of each beam corridor depends on a tolerance range of the coupling mouth and/or the drawbar eye.

4. The driver assistance system according to claim 3, wherein the distance (a) is smaller with increasing distance ($D_Z$).

5. The driver assistance system according to claim 1, wherein the video camera is arranged in the vehicle longitudinal axis (Z).

6. The driver assistance system according to claim 1, wherein the coupling mouth has a conically expanded wall section and the video camera is arranged above the conically expanded wall section.

7. The driver assistance system according to claim 1, wherein the coupling comprises a connecting flange for mounting on the towing vehicle and a coupling bolt mounted vertically in the coupling mouth, wherein the video camera is arranged in the vehicle longitudinal axis (Z) on the side of the coupling bolt facing away from the connecting flange.

8. The driver assistance system according to claim 1, wherein the coupling has a collision protection plate arranged above the coupling mouth and the video camera is attached behind the collision protection plate.

9. The driver assistance system according to claim 8, wherein the collision protection plate is formed with an opening and the video camera is arranged in alignment with the opening.

10. The driver assistance system according to claim 1, wherein the driver assistance system takes influence automatically or on driver release in the engine control and/or transmission control and/or brake control and/or height control of the air suspension.

11. A method for coupling a trailer to a towing vehicle, with the use of a video camera attached to the towing vehicle and an associated display device arranged in a driver's field of vision,
   wherein a static guide marking becomes visible in a video image of the display device along which a coupling mouth of a coupling arranged on the towing vehicle is brought into contact with a drawbar eye held on the trailer by a drawbar,
   wherein the guide marking is visualized by two beam corridors arranged symmetrically to the vehicle longitudinal axis (Z) converging towards one another in the rearward direction of the towing vehicle, and
   wherein the beam corridors each have an inner boundary line and an outer boundary line and during an approach of the coupling mouth and the drawbar eye a correct coupling appears when a reference element of the drawbar eye is arranged in the video image between the inner boundary line and the outer boundary line of both beam corridors.

12. The method according to claim 11, wherein a drawbar eye projecting over both outer boundary lines in the video image visualizes the lifting of the towing vehicle by its air suspension.

13. The method according to claim 11, wherein a drawbar eye arranged in the video image within the two inner boundary lines visualizes the lowering of the towing vehicle by its air suspension.

* * * * *